Patented Sept. 5, 1939

2,172,305

UNITED STATES PATENT OFFICE 2,172,305

RESINS SOLUBLE IN ALCOHOL

Werner Wolff and Karl Vierling, Ludwigshafen-on-the-Rhine, Germany, assignors to I. G. Farbenindustrie Aktiengesellschaft, Frankfort-on-the-Main, Germany No Drawing. Application December 9, 1937, Serial No. 178,880. In Germany December 11, 1936

1 Claim. (Cl. 260—104)

The present invention relates to resins soluble in alcohol.

We have found that resins soluble in alcohol are obtained by esterifying colophony or the resin acids contained therein with 2.2 dimethylol, butanol 1. This fact is surprising because the corresponding resins from glycerine, the best known trihydric alcohol, are not soluble in alcohol. Furthermore the resins obtained have a good compatibility with drying oils and nitrocellulose so that they may be used for the preparation of spirit lacquers, oil lacquers and nitrocellulose lacquers. Moreover the resins have a considerably higher stability to light than the known ester resins from colophony and glycerine.

The resins may be prepared in known manner by heating the trimethylolpropane with colophony or the resin acids contained therein in the presence or absence of accelerators, in particular acid substances, as for example boric acid or maleic acid.

The following example will further illustrate how this invention may be carried out in practice but the invention is not restricted to this example. The parts are by weight.

Example 900 parts of American colophony of the brand "WW" are fused with 390 parts of 2.2 dimethylol, butanol 1 and heated for about 5 hours at from 250° to 260° C. Water escapes and there is formed a pale brown resin having an acid value of from about 25 to 30 and a softening point which is somewhat higher than that of the colophony used. The resin is soluble in benzine and benzene hydrocarbons and also in alcohol and, in fact, to the extent of 1 part of resin to 4 parts of alcohol. It may be used for the preparation of oil lacquers, spirit lacquers and also nitrocellulose lacquers; the resulting lacquers show a smaller tendency to become yellow when exposed to light than lacquers prepared with the known ester resins on the basis of colophony and glycerine.

What we claim is:

Resins soluble in alcohol comprising esters of 2.2.dimethylol, butanol 1 and a member of the group consisting of colophony and the resin acids contained therein.

WERNER WOLFF.
KARL VIERLING.